(12) United States Patent
Watkins

(10) Patent No.: US 6,324,840 B1
(45) Date of Patent: Dec. 4, 2001

(54) BULK FUEL DELIVERY SYSTEM FOR OPERATING A FLUID DRIVEN POWER SOURCE AT A CONSTANT SPEED

(75) Inventor: Owen Watkins, Exton, PA (US)

(73) Assignee: General Transervice, Inc., Coatesville, PA (US)

( * ) Notice: Subject to any disclaimer, the term of this patent is extended or adjusted under 35 U.S.C. 154(b) by 0 days.

(21) Appl. No.: 09/675,856

(22) Filed: Sep. 29, 2000

(51) Int. Cl.$^7$ ........................................... G05D 7/00
(52) U.S. Cl. ................. 60/396; 137/8; 137/110; 137/486
(58) Field of Search .................. 137/110, 486, 137/8; 60/396

(56) References Cited

U.S. PATENT DOCUMENTS

| | | | |
|---|---|---|---|
| 3,981,618 | * 9/1976 | Nelson | 417/12 |
| 4,430,926 | * 2/1984 | Wallace | 91/516 |
| 5,325,884 | * 7/1994 | Mirel et al. | 137/110 |
| 5,609,027 | 3/1997 | Dunlevy . | |
| 5,775,101 | 7/1998 | Dunlevy . | |
| 5,957,148 | 9/1999 | Sell . | |
| 6,152,162 | * 11/2000 | Balazy et al. | 137/110 |

* cited by examiner

*Primary Examiner*—Stephen Hepperle
(74) *Attorney, Agent, or Firm*—Ratner & Prestia

(57) ABSTRACT

A portable fueling control system is provided for delivering bulk fuel to a vehicle from a pressurized source. The portable system includes a fluid driven power source for operating auxiliary instrumentation of the system. An inlet receives the bulk fuel from the pressurized source. The inlet has a primary fluid path and a secondary fluid path. A first flow rate control is in fluidic communication with the primary fluid path for adjustably controlling the flow rate of bulk fuel from the pressurized source to a system outlet. A first monitor is operably linked to the secondary fluid path and the first flow rate control. The first monitor is responsive to the flow rate of the secondary fluid path for actuating the first flow rate control to vary the pressure difference across the first flow rate control. In this way, the adjustment of the first flow rate control causes a proportional change in the fluid flow rate of the secondary path for operating the fluid driven power source at a substantially constant flow rate as bulk fuel is provided to the outlet at a variable flow rate.

13 Claims, 3 Drawing Sheets

BULK FUEL DELIVERY SYSTEM FOR OPERATING A FLUID DRIVEN POWER SOURCE AT A CONSTANT SPEED

BACKGROUND OF THE INVENTION

The invention relates to a portable re-fueling vehicle for providing bulk fuel from a pressurized reservoir. More particularly, this invention relates to a bulk fuel delivery control system in which a fluid driven power source of the system is driven at constant speed by fuel flow.

Major airports are frequently constructed to have large-capacity underground supply reservoirs for providing aircraft fuel. Access to the supply reservoirs is by way of hydrants located below the airport surface but accessible from the surface of the airport. The hydrants are equipped with flow-control valves whose open and closed positions are controlled by pressurized air supplied to the valve by a pneumatic hose under the control of the operator of the re-fueler vehicle.

A re-fueler vehicle of the hydrant type is not equipped with a refueling tank. The essential elements of a hydrant re-fueler vehicle are: a fuel hydrant hose and means for coupling the fuel hydrant hose to the hydrant; a pressurized air hose controllable by the re-fueler operator from a remote position, such as at the fuel intake valve of the aircraft and means for coupling the pressurized-air hose to the hydrant valve; at least one, and preferably two or more, fuel delivery hoses and means for coupling the fuel delivery hoses to the intake valve(s) of the aircraft intake usually located on the undersurface of one of the wings of the aircraft.; and means, usually including filtering means and metering means, interconnecting the hydrant and delivery fuel hoses on the re-fueler vehicle. No fuel pump is needed on a hydrant re-fueler vehicle. Pressure for causing the fuel to flow from the underground supply reservoirs into the tanks of the aircraft is provided by the underground support facilities at the airport.

Typically, a compressed air source is provided on the re-fueler cart for operating and controlling the hydrant valve and other ancillary components/instrumentation, such as filters, hose reels, etc. For example, it is known to utilize compressed air storage bottles to power such instrumentation. Yet, storage bottles are cumbersome and inconvenient to handle (i.e., re-charge). As such, it is desirable to employ an on-board air compressor on the re-fueler vehicle. Since a combustion engine compressor would pose a significant safety risk when processing bulk fuel, fluid driven air compressors are increasingly employed. The fluid driven air compressor utilizes the pressurized bulk fuel flow as a drive means.

However, present fluid driven air compressors suffer in that the rate of fluid flow varies considerably as the aircraft fuel tank is replenished. As the fuel flow rate diminishes along a main bulk fuel path, a commensurate decrease in fluid flow is provided to the fluid driven air compressor along a motor intake path. It is desirable that a re-fueler vehicle have an on-board air compressor operating at a constant speed.

As such, one known solution has been to provide a specialized mechanical orifice plate along the main fuel path of a re-fueler vehicle for producing a constant back pressure along a fluid motor intake path downstream of the orifice. In operation the orifice is relatively wide for a high flow rate and constricts as the fuel flow rate lessens. As can be appreciated, the orifice plate provides a constant pressure difference thereacross for varying levels of fluid flow provided to the main fuel path. However, the constant pressure difference of the orifice plate does not provide a substantially constant fluid flow along the motor intake path for driving the fluid driven motor at a constant speed. Moreover, the mechanical plate is cost prohibitive and typically requires a fluid motor feedback arrangement for practical use.

Accordingly, there is a need for a simplified and economical bulk fuel delivery system for operating a fluid driven power source at a constant speed.

SUMMARY OF THE INVENTION

The present invention comprises a portable fueling control system for providing bulk fuel to a vehicle from a stationary pressurized source. The portable system includes a fluid driven power source for operating auxiliary instrumentation of the system. An inlet receives the bulk fuel from the pressurized source. The inlet has a primary fluid path and a secondary fluid path. A first flow rate control is in fluidic communication with the primary fluid path for adjustably controlling the flow rate of bulk fuel from the pressurized source to a system outlet. A first flow monitor is operably linked to the secondary fluid path and the first flow rate control. The first flow monitor is responsive to the flow rate of the secondary fluid path for actuating the first flow rate control to vary the pressure difference across the first flow rate control. The adjustment of the first flow rate control causes a proportional change in the fluid flow rate of the secondary path for operating the fluid driven power source at a substantially constant flow rate as bulk fuel is provided to the outlet at a variable flow rate.

In another aspect of the present invention, a method of driving a fluid driven power source of a bulk fuel delivery system at a constant speed is provided. The method includes receiving bulk fuel from a pressurized source. The bulk fuel is then provided to a primary fluid path and a secondary fluid path. The flow rate along the primary fluid path from the pressurized source to a system outlet is controlled with a first flow rate control. Next, the flow rate of the secondary fluid path is determined. The first flow rate control is then actuated in accordance with the secondary path flow rate determination to vary the pressure difference across the first flow rate control for proportionally changing the fluid flow rate of the secondary path.

BRIEF DESCRIPTION OF THE SEVERAL VIEWS OF THE DRAWINGS

The foregoing summary as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
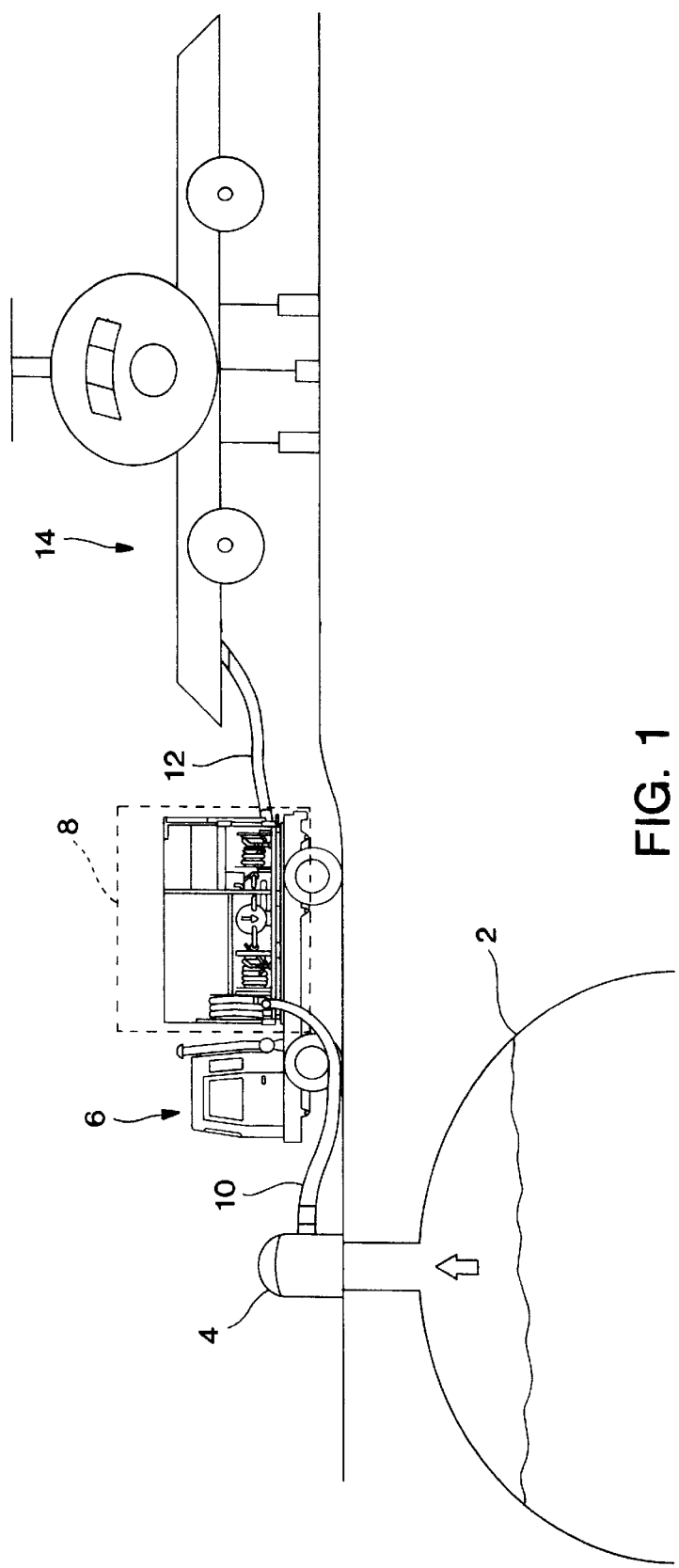
FIG. 1 is a plan view of a hydrant re-fueler vehicle providing bulk fuel from a fuel reservoir to an aircraft.

Certain terminology is used herein for convenience only and is not to be taken as a limitation on the present invention.

For example, the term "flow rate" as defined herein referes to a rate of fluid volume per unit of time. The term "throughput" as defined herein refers to the ratio in fluid volume per unit of time delivered to a fluid flow control device such as a valve, as compared to the fluid volume per unit of time output therefrom. In the drawings, the same reference numerals are used for designating the same elements throughout the several figures.

The present invention provides bulk fuel delivery control system in which a fluid driven power source of the system is driven at constant speed by fuel flow to operate auxiliary instrumentation of the system.

Referring now more specifically to the drawings, FIG. 1 shows a re-fueler vehicle 6. The re-fueler vehicle 6 generally functions to channel fuel from a pressurized fuel hydrant 4 to an aircraft 14. The hydrant provides bulk fuel from a subterranean reservoir 2 of a re-fueling facility to a fuel tank of the aircraft (not shown) It is recognized by those skilled in the art that the reservoir 2 may be located above ground, such as a mobile source.

A first fueling couple 10 of the re-fueler vehicle 6 is connected to the hydrant for receiving fuel from the reservoir 2. The couple 10 is in fluidic communication with a bulk fuel delivery system 8 of the re-fueler vehicle 6. The bulk fuel delivery system 8 includes a fluid driven power source 16 for operating auxiliary instrumentation (shown in FIG. 2). A second fueling couple 12 is in fluidic communication with the bulk fuel delivery system 8 and connected to the aircraft 14 for refueling purposes. In this way, pressurized fuel flows into the bulk fuel delivery system 8 of the re-fueler vehicle 6 for fueling the aircraft 14.

Figure 2:
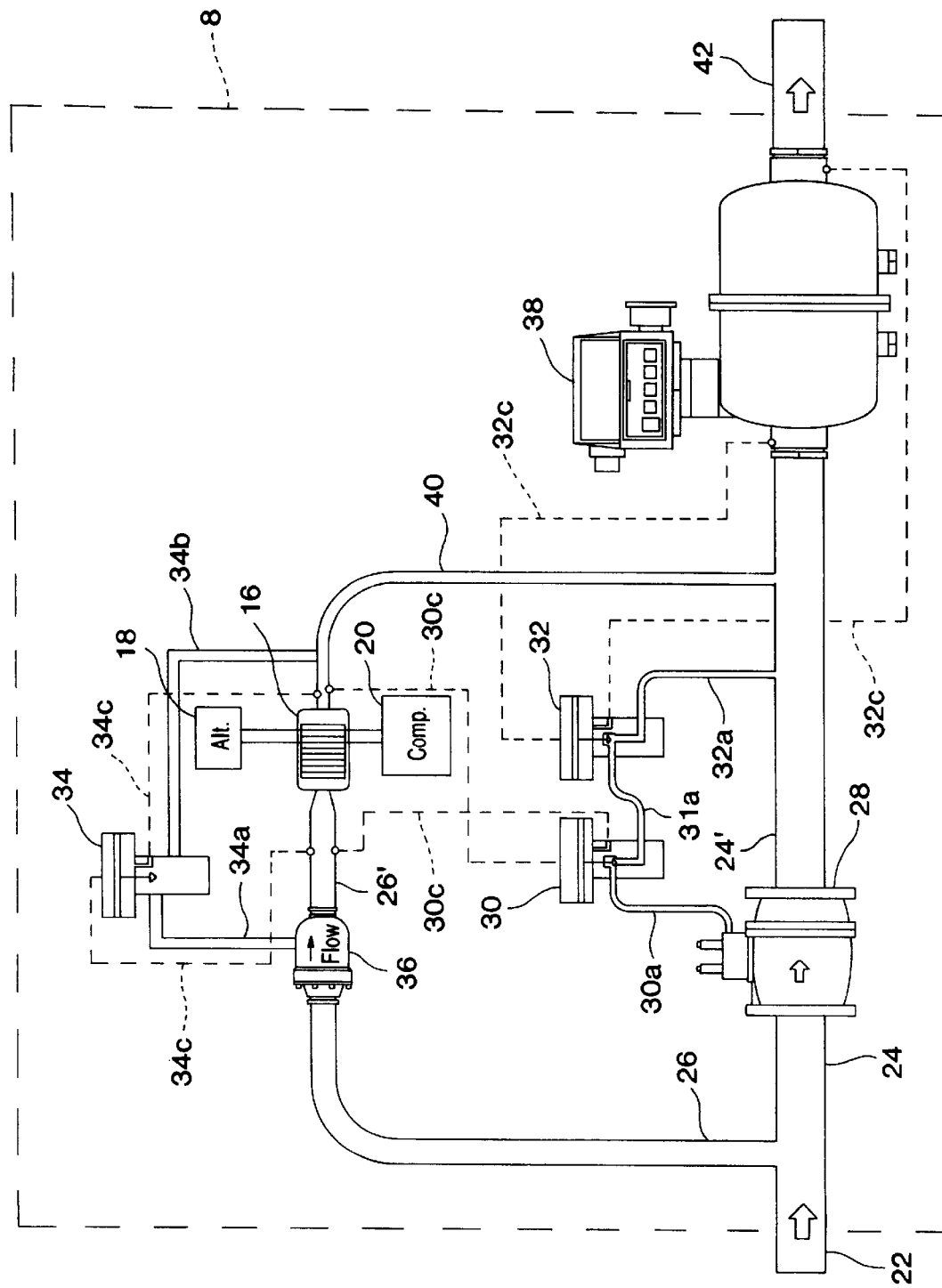
FIG. 2 is a schematic diagram of a bulk fuel delivery system of the re-fueler vehicle of FIG. 1, in accordance with the present invention.

Referring now more specifically to FIG. 2, a bulk fuel delivery system 8 in accordance with the present invention will now be described. Bulk fuel is provided from the first fueling couple 10 flows through an inlet 22 or "conduit" of the bulk fuel delivery system 8. The bulk fuel then divides along a primary fluid path and a secondary fluid path, generally designated 24 and 26 respectively. The secondary fluid path 26 carries only a small portion of the fuel provided to the inlet 22 to the input of a second flow rate control or "valve" 36. The bulk fuel being carried along the primary fluid path 24 is provided to the input of a first flow rate control or "valve" 28.

The first valve 28 adjustably controls the flow rate of bulk fuel from the inlet 22 along the primary fluid path 24 to the control side of the primary fluid path, designated $24^1$. The control side of the primary path $24^1$ is connected to a meter 38 for tracking the amount of fuel delivered to a system outlet 42. The meter 38 is connected to system outlet 42 which is in fluidic communication with second fueling couple 12. First valve 28 is preferably a commercially available piston type valve such as Model F377 available from the Ground Fueling Products Division of Whittaker Controls, Inc., 12838 Saticoy St., North Hollywood, Calif. 91605 U.S.A.

The second valve 36 adjustably controls the flow rate of fuel from the inlet 22 along secondary fluid path 26 to the control side of the secondary fluid path, designated $26^1$. The control side of the secondary fluid path $26^1$ is connected to the fluid driven power source 16 for the purpose of driving the power source 16. A return conduit 40 carries the fuel of the from the fluid driven power source 16 to the control side of the primary fluid path $24^1$. The fluid driven power source 16 is preferably a commercially available fluid driven motor such as Blackmer model # ATX-300 availabe from Blackmer, 1809 Century Avenue, Grand Rapids, Mich. 49509, U.S.A.

The flow rate of the the control side of the secondary fluid path $26^1$ provides the input to the fluid driven power source 16. The fluid driven power source is linked in the usual manner to an air compressor 20 and alternator 18 for operating pneumatic and electrical instrumentation of the bulk fuel delivery system 8.

A first flow monitor 30 is operably linked by fuel control lines 30a and 31a to the first valve 28 and a third flow rate flow monitor 32 respectively. The control side of the secondary fluid path $26^1$ and the return conduit 40 are monitored by flow monitor 30 by way of pressure sensing lines, generally designated 30c. The first flow monitor 30 is responsive to the flow rate of the control side of the secondary fluid path $26^1$ for regulating the valve 28 via fuel control line 30a to adjust the position of the piston (not shown) for varying the pressure difference across the valve 28. The pressure difference provided by the first valve 28 causes a proportional change in the fluid flow rate of the secondary path 26. More specifically, varying the valve throughput causes the change in pressure across the valve 28. As can be appreciated, a commensurate amount of fuel is drawn into or away from the secondary path 26. The corresponding increase or reduction in the flow rate of fuel in the secondary path 26 enables a substantially constant flow rate as bulk fuel is provided to the inlet 22 at a variable flow rate.

A second flow monitor 34 is operably linked by fuel control lines 34a and 34b to the second valve 36 and return conduit 40 respectively. The control side of the secondary fluid path $26^1$, the return conduit 40 are monitored by pressure sensing lines, generally designated 34c. The second flow monitor 34 is responsive to the flow rate of the control side of the secondary fluid path $26^1$ for regulating the second valve 36 via fuel control line 34a. The second valve is adjusted for varying the pressure difference across the second valve 36 upon detection of a pre-determined flow rate value. In a preferred embodiment the predetermined flow rate value is a maximum desired constant flow rate for powering the fluid driven power source 16. For example, in the preferred embodiment the second flow monitor would normally maintain second valve 36 at maximum throughput until the flow rate across the fluid driven power source 16 exceeded 49.5 g.p.m. (gallons per minute). When the flow rate exceeds 49.5 g.p.m. the second flow monitor 34 adjusts second valve 36 to maintain 49.5 g.p.m.

A third flow monitor 32 is operably linked by fuel control lines 31a and 32a to the first flow monitor 30 and the control side of the primary fluid path $24^1$ respectively. The outlet 42 is monitored by pressure sensing lines, generally designated 32c. The third flow monitor 32 is responsive to the flow rate of the control side of the primary fluid path $24^1$. The third flow monitor 32 regulates, via fuel control line 31a, the first flow rate control 28 by way of the first flow monitor 30. In this way the third flow monitor 32 adjusts the position of the piston of the first valve 28. The adjustment varies the pressure difference across the valve 28 upon detection of a predetermined maximum flow rate value. In a preferred embodiment, the predetermined flow rate value is a maximum flow rate value of a filter vessel or meter rating. The flow rate monitors 30, 32 and 34 are preferably commercially available flow control pilots such as Model F540-1 available from the Ground Fueling Products Division of Whittaker Controls, Inc., 12838 Saticoy St., North Hollywood, Calif. 91605 U.S.A.

Figure 3:
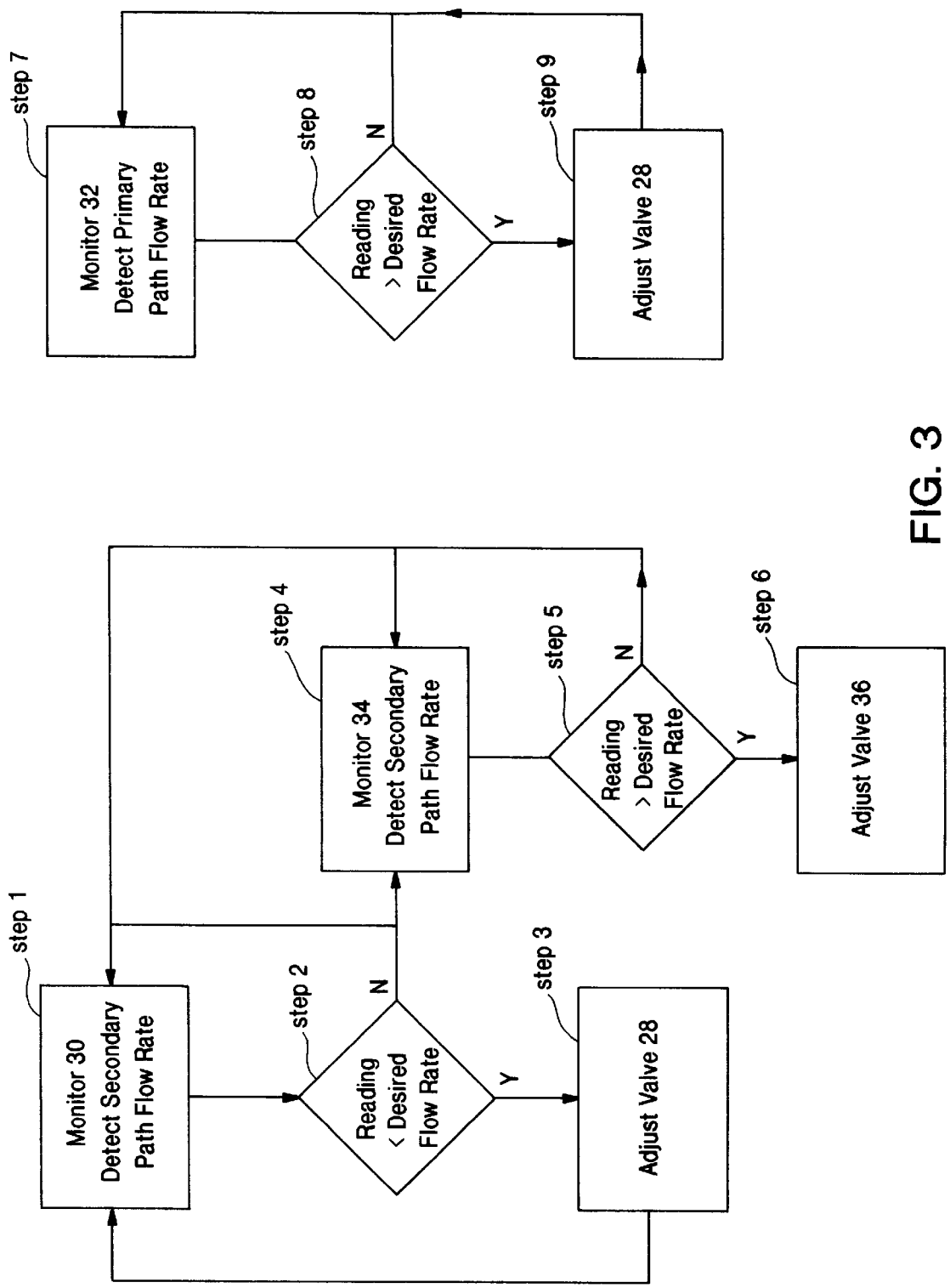
FIG. 3 is a flow diagram of the method of providing the constant flow rate to the fluid driven power source of FIG. 2, in accordance with the present invention.

The general method of operating the fluid driven power source 16 of the bulk fuel delivery system 8 at constant speed will now be described with reference to the flow chart of FIG. 3. As bulk fuel is provided to the inlet 22 from a pressurized source, monitors 30, 32 and 34 track the fluid flow rates along the primary and secondary fluid paths as shown in steps 1–3.

At step 1, monitor 30 detects the flow rate of the control side of the secondary path 26[1]. At step 2, the monitor 30 determines the flow rate of the control side of the secondary path 26[1]. The monitor 30 determines whether or not the detected flow rate is less than a predetermined constant flow rate value. If the detected flow rate is less than the predetermined maximum constant flow rate value, in step 3 the throughput of the valve 28 is adjusted and monitor 30 resumes detection in step 1. Likewise, where the detected flow rate is greater than a predetermined value, monitor 30 continues detection in step 1 and monitor 34 detects the flow rate of the control side of the secondary path 26[1] in step 4.

In step 4 monitor 34 detects the flow rate of the control side of the secondary path 26[1]. The monitor 34 determines in step 5 whether or not the detected flow rate exceeds a predetermined flow rate value. If the detected flow rate is in excess of a predetermined flow rate value, in step 6 the throughput of the valve 36 is adjusted. Likewise, where the detected flow rate does not exceed a predetermined value, monitor 30 resumes detection in step 1.

In step 7, monitor 32 detects the flow rate of the control side of the primary path 24[1]. The monitor 32 determines whether or not the detected flow rate exceeds a predetermined flow rate value in step 8. If the detected flow rate is in excess of a predetermined flow rate value the throughput of valve 28 is adjusted in step 9. Likewise, where the detected flow rate does not exceed a predetermined value monitor 32 resumes detection in step 7.

As can be appreciated, by varying the pressure difference across the first valve 28 in accordance with a detected flow rate, a proportional change in the fluid flow rate of the secondary path 26 results. As such the fluid flow rate of the secondary path 26 is "tracked" by the bulk fuel delivery system 8 for operating the fluid driven power source 16 at a substantially constant flow rate as bulk fuel is provided to the outlet 42 at a variable flow rate. Moreover, monitors 32 and 34 provide additional control of flow rates for ensuring that the flow rates of the bulk fuel delivery system of the present invention do not exceed desired levels.

It will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention.

What is claimed is:

1. A fueling control system for providing bulk fuel to a vehicle from a pressurized source, the portable system including a fluid driven power source for operating auxiliary instrumentation of the system, comprising:

an inlet for receiving the bulk fuel from the pressurized source, the inlet having a primary fluid path and a secondary fluid path;

a first flow-rate control in fluidic communication with the primary fluid path for adjustably controlling the flow rate of bulk fuel from the pressurized source to a system outlet; and a first monitor operably linked to the secondary fluid path and the first flow rate control, the monitor being responsive to the flow rate of the secondary fluid path for actuating the first flow rate control to vary the pressure difference across the first flow rate control for causing a proportional change in the fluid flow rate of the secondary path to operate the fluid driven power source at a substantially constant flow rate as bulk fuel is provided to the outlet at a variable flow rate.

2. The fueling control system in accordance with claim 1, further comprising:

a second flow rate control in fluidic communication with the secondary fluid path for adjustably controlling the flow rate of fuel from the pressurized source to the fluid driven power source; and a second monitor operably linked to the secondary fluid path and the second flow rate control, the second monitor responsive to the flow rate of the secondary fluid path for actuating the second flow rate control to vary the pressure difference across the second flow rate control upon detection of a predetermined flow rate value.

3. The fueling control system in accordance with claim 2, wherein the predetermined flow rate value is a maximum desired constant flow rate for powering the fluid driven power source.

4. The fueling control system in accordance with claim 1, further comprising:

a third monitor operably linked to the primary fluid path and the first flow rate control, the third monitor responsive to the flow rate of the primary fluid path for actuating the first flow rate control to vary the pressure difference across the second flow rate control upon detection of a predetermined maximum flow rate value.

5. The fueling control system in accordance with claim 4, wherein the predetermined flow rate value is a maximum flow rate value of a vehicle to avoid exceeding the flow rate of a component.

6. A mobile fueling control system for providing bulk fuel to an aircraft from a pressurized source, the mobile system including a fluid driven motor for operating auxiliary instrumentation of the system, comprising:

a conduit for receiving the bulk fuel at an inlet thereof from the pressurized source, the conduit having a primary fluid path and a secondary fluid path;

a first valve in fluidic communication with the primary fluid path for adjustably controlling the throughput of bulk fuel from the pressurized source to a conduit outlet;

a first monitor operably linked to the secondary fluid path and to the first valve, the monitor being responsive to the flow rate of the secondary fluid path for actuating the first valve to vary the pressure difference across the first valve for causing a proportional change in the fluid flow rate of the secondary path to operate the fluid driven motor at a substantially constant flow rate as bulk fuel is provided to the conduit outlet at a variable flow rate.

7. The mobile fueling control system in accordance with claim 6, further comprising:

a second monitor operably linked to the primary fluid path and the first valve, the second monitor being responsive to the flow rate of the secondary fluid path for actuating the first valve to vary the pressure difference across the first valve upon detection of a predetermined flow rate value.

8. The mobile fueling control system in accordance with claim 7, wherein the predetermined flow rate value is a maximum desired constant flow rate for powering the fluid driven power source.

9. The mobile fueling control system in accordance with claim 6, further comprising:

a third monitor operably linked to the primary fluid path and the second valve, the third monitor responsive to the flow rate of the primary fluid path for actuating the second valve to vary the pressure difference across the second valve upon detection of a predetermined flow rate value.

10. The portable fueling control system in accordance with claim 9, wherein the predetermined flow rate value is a maximum flow rate value to avoid exceeding the flow rate of a component.

11. A method of providing a constant flow rate of fluid to a fluid driven power source of a bulk fuel delivery system, the method comprising:

receiving the bulk fuel from a pressurized source;

providing the bulk fuel to a primary fluid path and a secondary fluid path;

controlling the flow rate along the primary fluid path from the pressurized source to a system outlet with a first flow rate control; and determining the flow rate of the secondary fluid path;

actuating the first flow rate control in accordance with the secondary path flow rate determination to vary the pressure difference across the first flow rate control for causing a proportional change in the fluid flow rate of the secondary path to operate the fluid driven power source at a substantially constant flow rate as bulk fuel is provided to the outlet at a variable flow rate.

12. The method of claim 11 further comprising the steps of:

controlling the flow rate along the secondary fluid path from the pressurized source to a fluid driven power source with a second flow rate control; and actuating the second flow rate control in accordance with the secondary path flow rate determination to vary the pressure difference across the second flow rate control where the determined flow rate exceeds a predetermined threshold.

13. The method of claim 11 further comprising the steps of:

determining the flow rate of the primary fluid path; and actuating the first flow rate control in accordance with the primary path flow rate determination to vary the pressure difference across the first flow rate control where the determined flow rate exceeds a predetermined threshold.

\* \* \* \* \*